(12) United States Patent
Svihla et al.

(10) Patent No.: US 11,739,763 B2
(45) Date of Patent: Aug. 29, 2023

(54) IMPELLER ATTACH MECHANISM

(71) Applicant: Progress Rail Locomotive Inc., LaGrange, IL (US)

(72) Inventors: Gary R. Svihla, Burr Ridge, IL (US); Xinmin Xu, Naperville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 17/524,582

(22) Filed: Nov. 11, 2021

(65) Prior Publication Data

US 2023/0147254 A1    May 11, 2023

(51) Int. Cl.
*F04D 29/26* (2006.01)
*F04D 29/28* (2006.01)
*F04D 17/10* (2006.01)
*F01D 5/02* (2006.01)

(52) U.S. Cl.
CPC ........... *F04D 29/266* (2013.01); *F04D 17/10* (2013.01); *F04D 29/284* (2013.01); *F01D 5/025* (2013.01); *F05D 2220/40* (2013.01)

(58) Field of Classification Search
CPC .... F04D 29/266; F04D 29/053; F04D 29/054; F04D 29/263; F04D 17/10; F01D 5/025
See application file for complete search history.

(56) References Cited

U.S. PATENT DOCUMENTS

| | | | |
|---|---|---|---|
| 4,721,441 A | | 1/1988 | Miyashita et al. |
| 5,961,246 A | * | 10/1999 | Mitsubori ............. F04D 29/266 |
| | | | 403/375 |
| 6,032,466 A | | 3/2000 | Woollenweber et al. |
| 6,364,634 B1 | | 4/2002 | Svihla et al. |
| 6,499,884 B1 | | 12/2002 | Svihla et al. |
| 6,499,969 B1 | | 12/2002 | Tombers et al. |
| 6,896,479 B2 | | 5/2005 | Svihla et al. |

(Continued)

FOREIGN PATENT DOCUMENTS

| | | |
|---|---|---|
| CH | 712614 B1 | 11/2020 |
| CN | 205841303 U | 12/2016 |

(Continued)

OTHER PUBLICATIONS

Written Opinion and International Search Report for Int'l. Patent Appln. No. PCT/US2022/049086, dated Mar. 21, 2023 (11 pgs).

*Primary Examiner* — J. Todd Newton
*Assistant Examiner* — Behnoush Haghighian (57) ABSTRACT

An impeller attach mechanism for a turbocharger including a stud extending from a central bore of a compressor impeller toward a turbine wheel, the stud having a first threaded region and a second threaded region; a shaft coupled to the turbine wheel and extending toward the compressor impeller, the shaft having a leading portion, the leading portion having a threaded interior configured to engage the second threaded region of the stud; and an insert having an internal portion and an external portion, the internal portion having a threaded external surface to engage the compressor impeller, the internal portion having a threaded internal surface to engage the first threaded region of the stud, the external portion configured to surround the leading portion of the shaft.

20 Claims, 6 Drawing Sheets

(56) References Cited

U.S. PATENT DOCUMENTS

| | | | |
|---|---|---|---|
| 6,948,913 B2* | 9/2005 | Heyes | F04D 29/284 |
| | | | 416/204 R |
| 7,108,488 B2 | 9/2006 | Larue et al. | |
| 7,371,047 B2 | 5/2008 | Burmester et al. | |
| 8,128,865 B2 | 3/2012 | Jahnz et al. | |
| 8,820,072 B2 | 9/2014 | Figura et al. | |
| 8,858,156 B2 | 10/2014 | Swenson et al. | |
| 9,074,477 B2* | 7/2015 | Pinkney | F04D 29/266 |
| 9,127,690 B2 | 9/2015 | Knaack | |
| 9,181,855 B2 | 11/2015 | Svihla et al. | |
| 9,200,567 B2 | 12/2015 | Parker et al. | |
| 9,279,343 B2 | 3/2016 | Knaack | |
| 9,470,240 B2 | 10/2016 | Uneura | |
| 9,482,240 B2 | 11/2016 | Gerard et al. | |
| 9,546,563 B2 | 1/2017 | Panambur et al. | |
| 9,726,020 B2 | 8/2017 | Loewenberg | |
| 9,835,164 B2* | 12/2017 | Svihla | F04D 29/266 |
| 9,874,099 B2 | 1/2018 | Rexavier et al. | |
| 9,915,172 B2 | 3/2018 | Annati et al. | |
| 10,018,205 B2* | 7/2018 | Pinkney | F04D 29/602 |
| 10,119,417 B2 | 11/2018 | Bucking | |
| 10,161,265 B2 | 12/2018 | Isayama et al. | |
| 10,436,211 B2 | 10/2019 | McArdle et al. | |
| 10,677,099 B2 | 6/2020 | Hossbach | |
| 11,401,942 B2* | 8/2022 | Donato | F04D 17/10 |
| 2010/0143111 A1 | 6/2010 | Kuehnel | |
| 2010/0215506 A1 | 8/2010 | Heyes et al. | |
| 2013/0330193 A1* | 12/2013 | Asano | F04D 29/266 |
| | | | 416/169 R |
| 2015/0044047 A1* | 2/2015 | Pinkney | F04D 25/024 |
| | | | 416/95 |
| 2015/0275921 A1* | 10/2015 | Pinkney | F16D 1/076 |
| | | | 416/204 R |
| 2016/0097283 A1* | 4/2016 | Svihla | F02C 6/12 |
| | | | 417/407 |
| 2016/0097302 A1 | 4/2016 | Svihla et al. | |
| 2016/0177960 A1 | 6/2016 | Svihla et al. | |
| 2016/0177965 A1 | 6/2016 | Svihla et al. | |
| 2017/0002828 A1 | 1/2017 | Rexavier et al. | |
| 2018/0328373 A1 | 11/2018 | Aynacioglu et al. | |
| 2020/0182137 A1 | 6/2020 | Carr et al. | |
| 2021/0156304 A1 | 5/2021 | Kobielski et al. | |
| 2021/0355956 A1* | 11/2021 | Donato | F04D 29/266 |

FOREIGN PATENT DOCUMENTS

| | | |
|---|---|---|
| CN | 207728444 U | 8/2018 |
| DE | 102015216319 A1 | 3/2017 |
| EP | 1467062 | 10/2004 |
| EP | 2865897 B1 | 4/2016 |
| JP | 3587350 B2 | 11/2004 |
| JP | 5598433 B2 | 10/2014 |
| WO | 2014083325 | 6/2014 |

* cited by examiner

IMPELLER ATTACH MECHANISM

TECHNICAL FIELD

The present disclosure relates generally to turbochargers and, more particularly, to turbochargers with a compressor impeller joint.

BACKGROUND

Internal combustion engines, for example, diesel engines, gasoline engines, or natural gas engines, employ turbochargers to deliver compressed air to combustion chambers within the engine. An increased supply of air enables increased fuel combustion within the combustion chambers of the engine, resulting in increased power output from the engine.

A typical turbocharger rotor includes a shaft extending between a compressor impeller (also referred to as a compressor wheel) and a turbine. Bearings typically support the shaft, and separate housings coupled together enclose the compressor impeller, the turbine, and the bearings. In operation, hot exhaust from the engine flows through the turbine housing and expands over the turbine, rotating the turbine and the shaft, which in turn rotates the compressor impeller. The compressor impeller receives cool air from ambient surroundings and forces compressed air into combustion chambers of the engine. Turbocharger rotors typically require attachment of the compressor impeller to a shaft system via a joint. This joint must align to the shaft system along an axis of rotation during rotor balancing and assembly installation, for example, with little to no variance from the balanced state in order to maintain balance and remain secure throughout the service life of the turbocharger rotor.

Although small turbochargers can utilize a simple screw-type shaft to attach to the compressor impellers, larger compressor impellers (such as those found in locomotives, for example) typically require a tensioning element and tool access to a nose of the compressor impeller, in order to tighten the tensioning element. In other arrangements, separate tension elements, such as an integral extension to the shaft system, may be utilized, but these elements may require large torque application or tensioning via hydraulic means. In addition, complicated torque transmission features such as splines or keys take up space that increases the corresponding bore diameter along the length of the compressor impeller thereby compromising overall strength and ultimately fatigue life.

U.S. Pat. No. 9,835,164 ("the '164 patent") discloses an impeller assembly that aims to simplify manufacturing and assembly. In particular, the '164 patent discloses a turbocharger rotor that has a turbine wheel and shaft, a compressor impeller, an insert and a stud. The stud includes a first threaded portion that engages a threaded portion of the insert, while a second threaded portion engages a threaded portion of the shaft. The first and second threaded portions are spaced apart axially, allowing the second threaded portion, for example, to extend deeper into the shaft. While the system of the '164 patent achieves a desired simplification of manufacturing and assembly, there is still a need for a compressor impeller assembly that also maintains alignment and minimizes rocking movement during operation of the turbocharger.

The compressor impeller assembly of the present disclosure solves one or more of the problems set forth above and/or other problems of the prior art.

SUMMARY

In accordance with one aspect of the present disclosure, an impeller attach mechanism for a turbocharger is disclosed. The impeller attach mechanism may include a stud extending from a central bore of a compressor impeller toward a turbine wheel. The stud may have a first threaded region and a second threaded region. The impeller attach mechanism may also include a shaft coupled to the turbine wheel and extending toward the compressor impeller, and may have a leading portion with a threaded interior configured to engage the second threaded region of the stud. An insert may include an internal portion and an external portion. The internal portion may have a threaded external surface to engage the compressor impeller, and may also have a threaded internal surface to engage the first threaded region of the stud. The external portion may be configured to surround the leading portion of the shaft.

In accordance with another aspect of the present disclosure, an impeller attach mechanism for a turbocharger is disclosed. The impeller attach mechanism may include a stud, a shaft, an insert, a thrust washer, and an impeller collar. The stud may extend from a central bore of a compressor impeller, and may have a first threaded region and a second threaded region. The shaft may be coupled to the turbine wheel, and may have a leading portion with a threaded interior configured to engage the second threaded region of the stud. The insert may have an internal portion and an external portion, with the internal portion housed within the compressor impeller. The internal portion may also have a threaded internal surface to engage the first threaded region of the stud, and the external portion may be configured to engage an external surface of the leading portion of the shaft. The thrust washer may have a washer bore, and the impeller collar may have a turbine side extension radially disposed in the washer bore between the shaft and the thrust washer.

In accordance with yet another aspect of the present disclosure, a turbocharger is disclosed. The turbocharger may include a turbine wheel, a compressor impeller, a stud, a shaft, and an insert. The compressor impeller may have a central bore and a hub extension protruding toward the turbine wheel. The stud may extend from the central bore of the compressor impeller and may have a first threaded region and a second threaded region. The shaft may be coupled to the turbine wheel, and may have a leading portion. The leading portion may have a threaded interior configured to engage the second threaded region of the stud. The insert may have an internal portion and an external portion. The internal portion may have a threaded internal surface to engage the first threaded region of the stud, and may be dimensioned to radially encase the first threaded region of the stud. In addition, the hub extension may be dimensioned to radially encase the internal portion of the insert, the leading portion of the shaft may be dimensioned to radially encase the second threaded region of the stud, and the external portion of the insert may be dimensioned to configured to radially encase the leading portion of the shaft.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
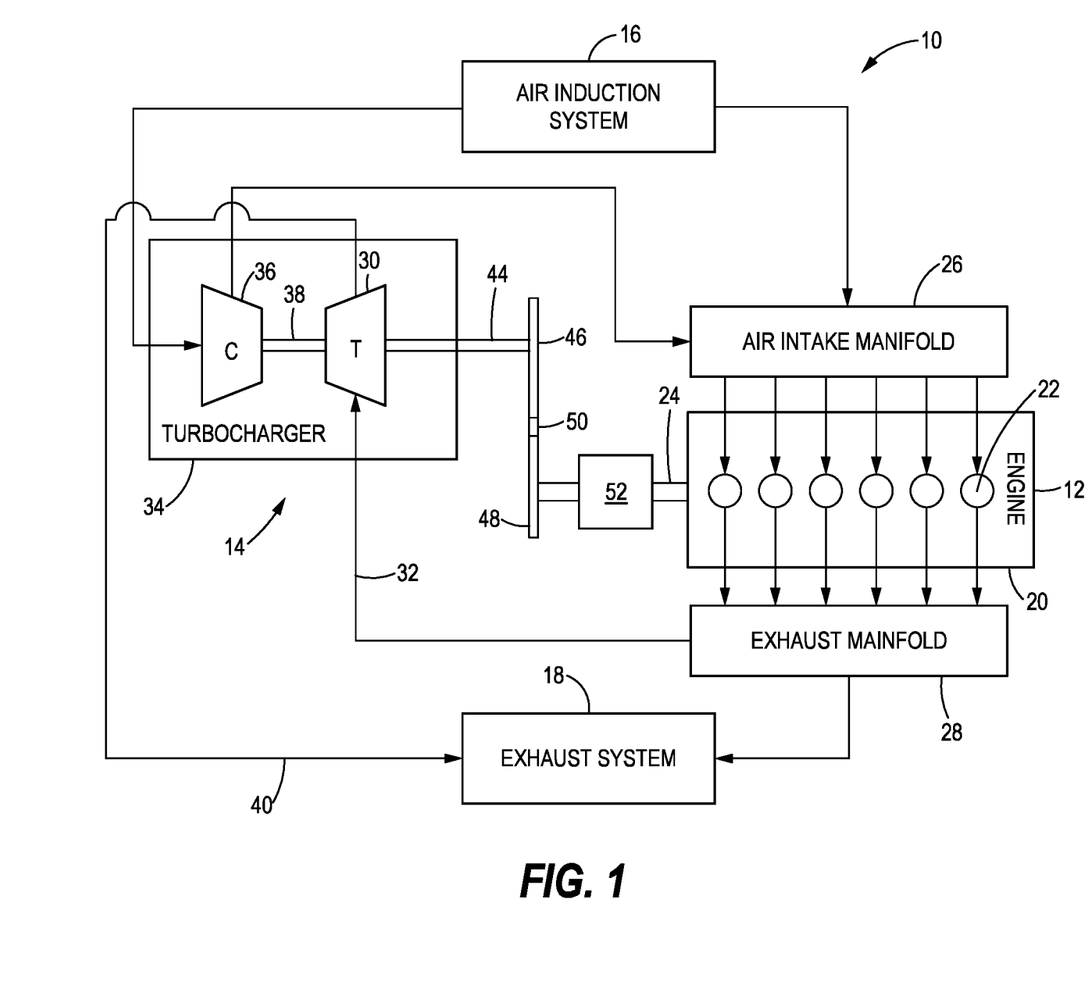
FIG. 1 is a schematic illustration of an engine system including a turbocharger, in accordance with an embodiment of the present disclosure.

Referring now to FIG. 1, an exemplary power system 10 is illustrated schematically. The power system 10 includes an internal combustion engine 12, an integrated turbocharger 14, an air induction system 16, and an exhaust system 18. For the purposes of this disclosure, the engine 12 may be a two-stroke diesel engine, although one skilled in the art will recognize that the engine may be any other type of internal combustion engine such as, for example, a four-stroke diesel engine or a two- or four-stroke gasoline or gaseous fuel-powered engine. Further, the engine 12 may find applications in mobile machines (not shown) such as, but not limited to, locomotives, vehicles, heavy mechanical equipment, large tractors, on-road vehicles, off-road vehicles, marine vessels and the like, as well as in stationary machines (not shown) such as generator sets and pumps.

The engine 12 may include an engine block 20 that at least partially defines a plurality of cylinders 22. A piston (not shown) may be slidably disposed within each cylinder 22 to reciprocate between a top-dead-center position and a bottom-dead-center position, and a cylinder head (not shown) may be associated with each cylinder. Each cylinder 22, piston, and cylinder head may, together, at least partially define a combustion chamber. In the embodiment illustrated in FIG. 1, the engine 12 includes six cylinders 22 arranged in an inline configuration. However, it is contemplated that the engine 12 may include a greater or lesser number of cylinders 22, and that the cylinders may be arranged in a V-configuration (i.e., a configuration having first and second banks or rows of cylinders), an opposing-piston configuration, or another configuration as will be apparent to those skilled in the art. Combustion of a fuel and air mixture in each cylinder 22 generates motive power that rotates an engine output shaft 24, and a resultant exhaust gas is produced, as is known in the art.

The engine 12 may further include an air intake manifold 26 and an exhaust manifold 28 that are selectively in fluid communication with each compression cylinder 22. The air intake manifold 26 may provide compressed intake air to the compression cylinders 22 from the air induction system 16, which draws air from the ambient atmosphere surrounding the engine 12 and any machine in which the engine is installed. Compressed air from the air intake manifold 26, along with fuel from a fuel tank (not shown), forms a combustible mixture that ignites when compressed, such as in each cylinder 22, or in the presence of a spark, for example. Combustion byproducts are evacuated from each cylinder 22 through the exhaust manifold 28, to one of the exhaust system 18 and the turbocharger 14. At least a portion of the exhaust gases may be transmitted to the exhaust system 18 for after-treatment prior to being released back into the atmosphere. Another portion of the exhaust gases may be transmitted to the turbocharger 14, and, more specifically, to a turbine wheel 30 via a high pressure exhaust gas line 32, for example.

A turbocharger housing 34 may be configured to direct the pressurized exhaust gas toward the turbine wheel 30, which may be mounted opposite a compressor impeller 36 on a shaft 38 within the turbocharger housing. In an exemplary embodiment, the shaft 38 may be made of a metal, such as steel. The compressor impeller 36 may be mounted on the shaft 38, and configured for rotation with the shaft and turbine wheel 30. When the temperature and pressure of the exhaust gas from the engine 12 are sufficient, exhaust torque generated by the exhaust gas drives the turbine wheel 30, which causes rotation of the shaft 38 and, ultimately, the compressor impeller 36. The rotating compressor impeller 36 thereby compresses air received from the air induction system 16, and outputs compressed air to the air intake manifold 26, where the compressed air is mixed with air provided by the air induction system. After powering the turbine wheel 30, spent exhaust gas is discharged to the exhaust system 18 via, for example, a low pressure exhaust gas return line 40.

During some operating conditions of the engine 12, it may be desirable to drive the turbine wheel 30 of the turbocharger 14 even though a temperature and pressure of the exhaust gas may be insufficient to rotate the turbine wheel at a desired speed. For example, at low engine speeds, such as when the engine 12 is idling, emissions of pollutants such as nitrous oxides (NOx) can increase and low exhaust temperatures can make exhaust after treatment systems in the exhaust system 18 ineffective. In one exemplary embodiment, to selectively provide direct drive to the turbocharger 14 by the engine 12 when the operating conditions dictate, the engine output shaft 24 may drive the shaft 38 when the exhaust gas will not drive the turbine wheel 30, and may be disengaged when the exhaust gas will create sufficient torque and rotate the turbine wheel and the compressor impeller 36 at sufficient speeds so that direct drive by the engine is unnecessary.

For example, in one embodiment, a carrier shaft 44 may be operatively coupled to the turbine wheel 30 and may have a carrier drive gear 46 mounted thereon and rotatable therewith. An operative connection between the engine 12 may be provided by a turbocharger drive gear 48 connected to a gear train or transmission 52 that is driven by the engine output shaft 24. The turbocharger drive gear 48 may be operatively connected to the carrier drive gear 46 by one or more idler gears 50 so that the carrier shaft 44 will spin at a desired speed and direction relative to the engine output shaft 24. In other embodiments, other appropriate drive mechanisms and arrangements may be utilized to drive the turbine wheel 30 and compressor impeller 36.

Figure 2:
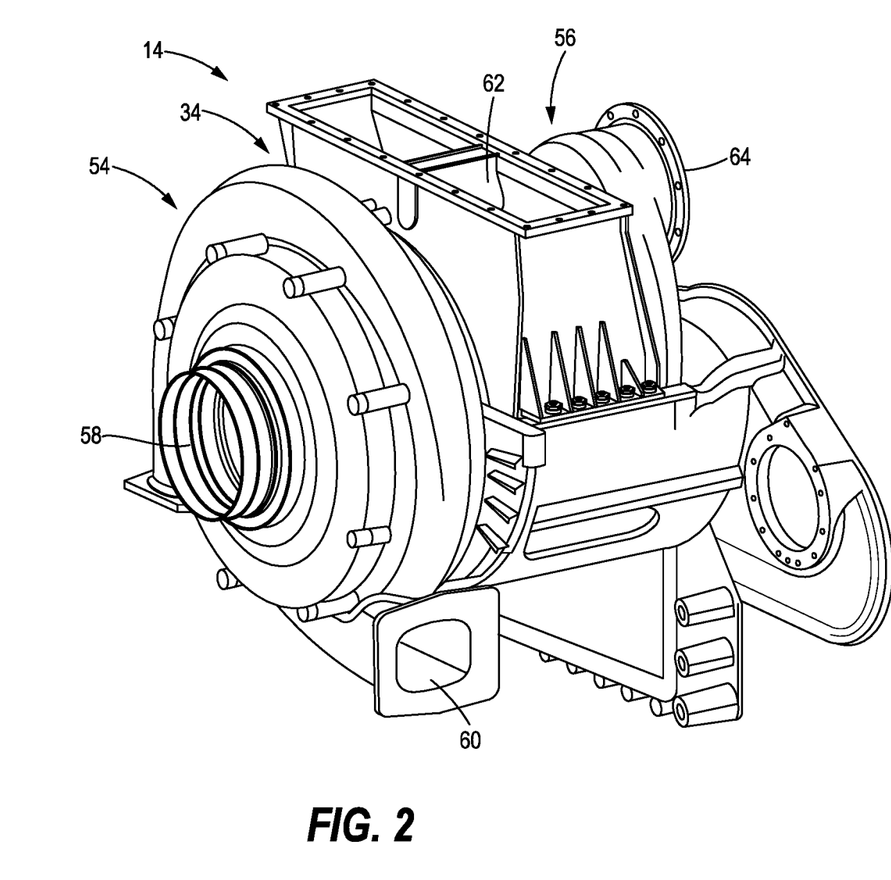
FIG. 2 is a perspective view of the turbocharger of FIG. 1, in accordance with an embodiment of the present disclosure.

With reference to FIG. 2, and continued reference to FIG. 1, an exemplary embodiment of the turbocharger 14 is illustrated. The turbocharger housing 34 includes both a compressor housing 54 and a turbine housing 56. In operation, air may enter the compressor housing 54 from the air induction system 16 via a compressor inlet 58, and may exit the compressor housing toward the air intake manifold 26 via a compressor outlet 60. Similarly, exhaust gases may enter the turbine housing 56 from the exhaust manifold 28 via a turbine inlet 64, and may exit the turbine housing toward the exhaust system 18 via a turbine exhaust duct 62.

Figure 3:
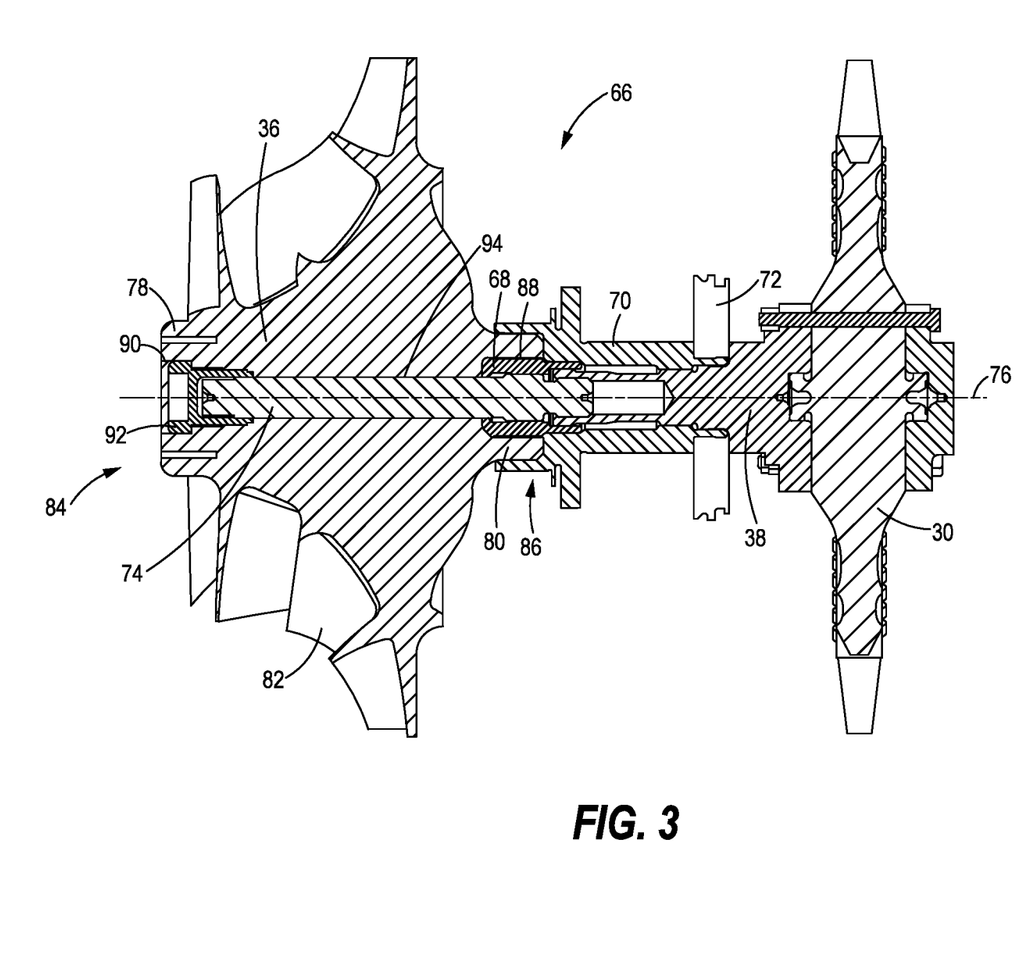
FIG. 3 is a longitudinal cross-sectional view of the turbocharger rotor within the turbocharger of FIG. 1, in accordance with an embodiment of the present disclosure.

Referring now to FIG. 3, an exemplary embodiment of a compressor impeller assembly 66 is illustrated. The compressor impeller assembly 66 may be comprised of various components, including the compressor impeller 36, an insert 68, an impeller collar 70, a thrust washer 72, a stud 74 and the shaft 38, all of which may be disposed around a rotational axis 76. The compressor impeller 36 may include a nose 78, a hub extension 80, and blades 82. The nose 78 may be disposed adjacent a front end 84 of the compressor impeller 36, and the hub extension 80 may be disposed adjacent a rear end 86 of the compressor impeller 36. The rear end 86 may be disposed opposite the front end 84. The blades 82 may be disposed between the nose 78 and the hub extension 80. In an exemplary embodiment, the compressor impeller 36 may be made of metal, such as aluminum or an aluminum alloy material.

The hub extension 80 may extend toward the rear end 86 of the compressor impeller 36, and may have a diameter smaller than an outer diameter of the blades 82. The hub extension 80 may also have a generally cylindrically shaped outer surface. It is contemplated, however, that the outer surface may have an elliptical, polygonal, or any other shape known in the art. Compressor impeller 36 may accordingly have a first impeller bore 88, which may be disposed within the hub extension 80 adjacent the rear end 86 of the compressor impeller. The first impeller bore 88 may extend the length of the hub extension 80, and may have an internal thread. Compressor impeller 36 may also have a second impeller bore 90, which may be disposed within the nose 78 adjacent the front end 84. The second impeller bore 90 may be a stepped bore extending from the front end 84 toward the rear end 86, and be dimensioned to house a drive feature 92 and at least a portion of the stud 74. The drive feature 92 may both provide a seal at the front end 84 of the compressor impeller 36 from moisture intrusion, and also assist with securing the stud 74 within the compressor impeller 36. Finally, the compressor impeller 36 may also have a third impeller bore 94 disposed between the front end 84 and the rear end 86, and may be dimensioned to accommodate the stud 74.

Figure 4:
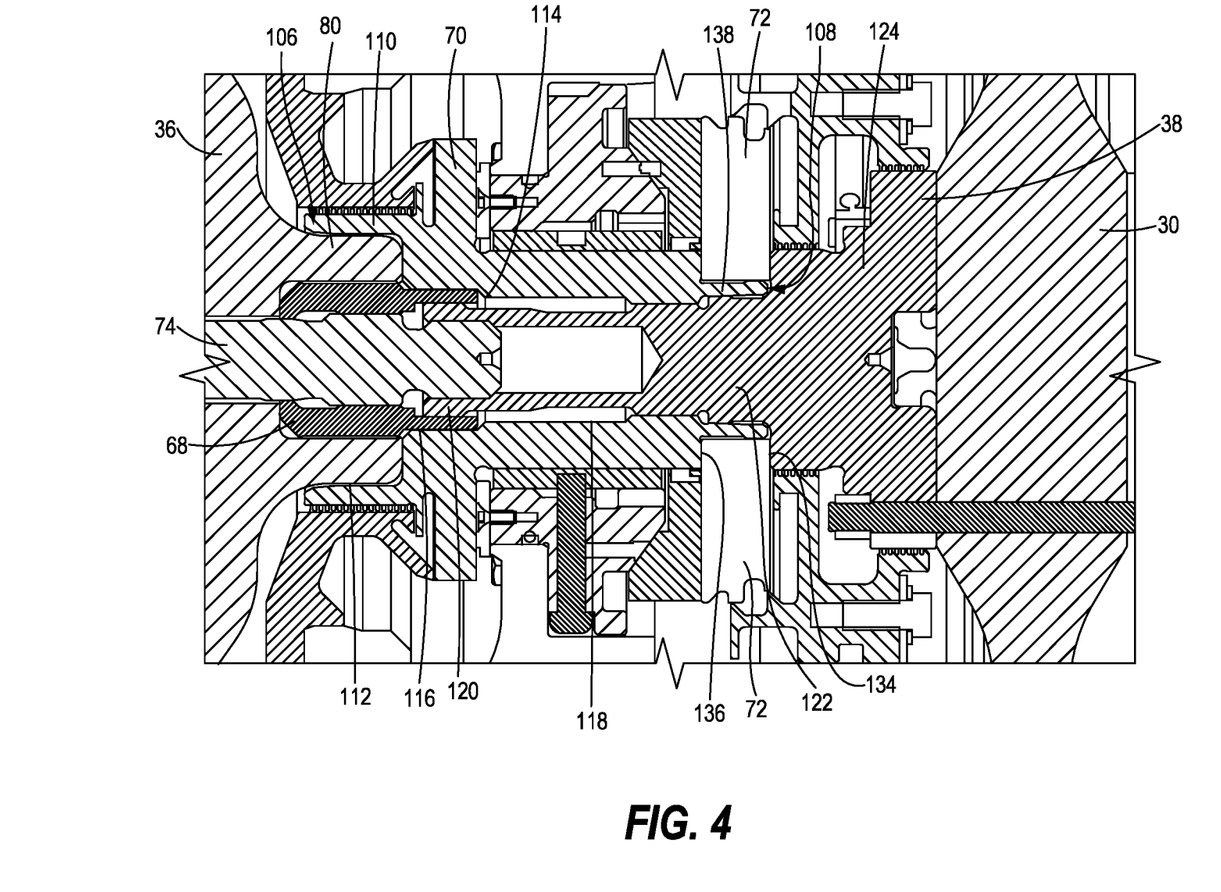
FIG. 4 is an enlarged cross-sectional view of a portion of the turbocharger of FIG. 1, in accordance with an embodiment of the present disclosure.
Figure 5:
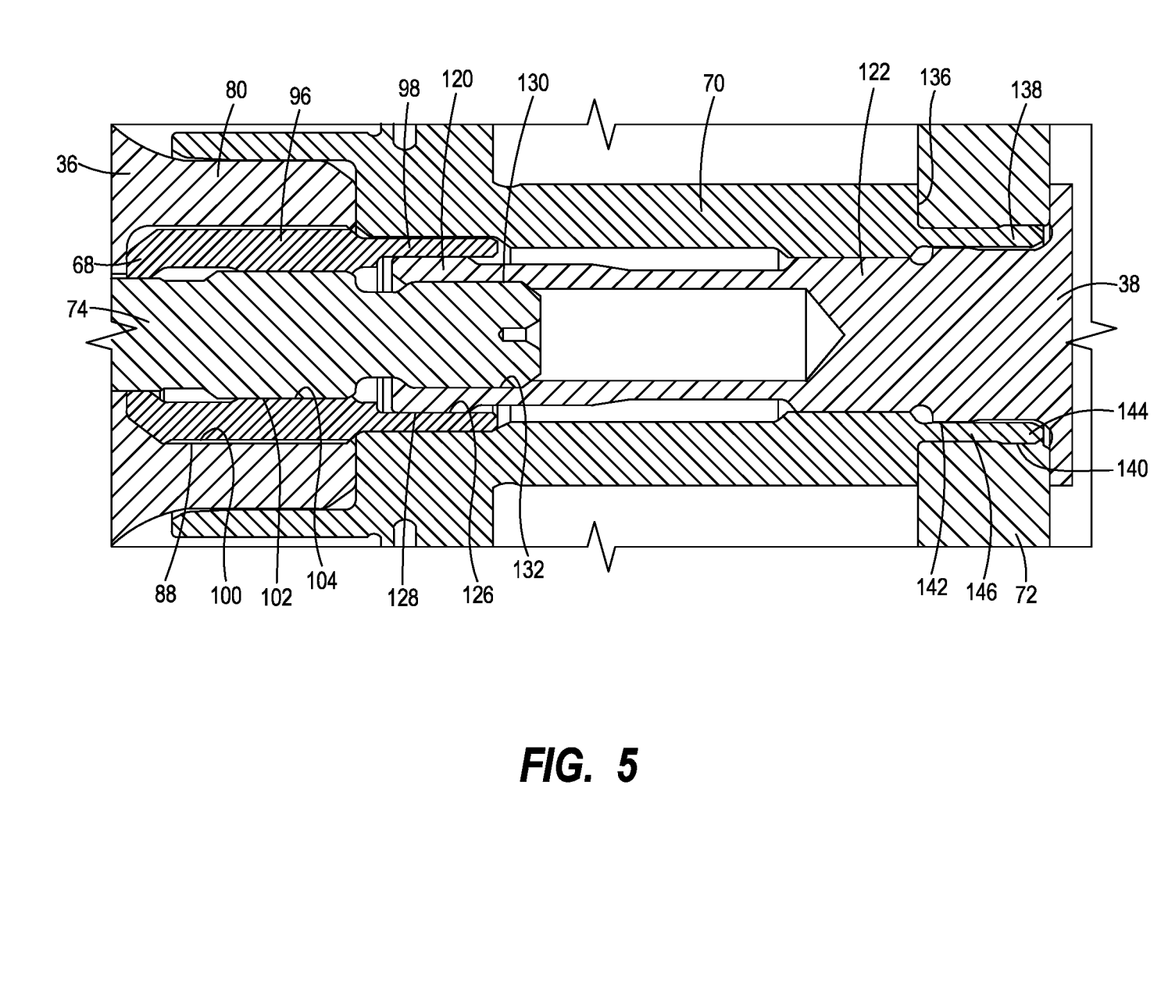
FIG. 5 is an enlarged cross-sectional view of a portion of the turbocharger rotor of FIG. 3, in accordance with an embodiment of the present disclosure.

With reference to FIGS. 4 and 5, and with continued reference to FIG. 2, the insert 68 may have a first insert portion 96 that may be disposed within the first impeller bore 88 and a second insert portion 98 that may be disposed outside first impeller bore. The first insert portion 96 may have an exterior surface 100 that may be threaded, so as to matingly engage with the threaded interior surface of the first impeller bore 88 during installation of the insert 68 within the first impeller bore 88. A portion 102 of an interior surface of the first insert portion 96 may also be threaded. This threaded portion 102 may have a first pitch, and may be configured to matingly engage with a first threaded exterior portion 104 of the stud 74. As such, the threaded portion 102 of the first insert portion 96 may have the same pitch as the first threaded exterior portion 104 of the stud. In one embodiment, the threaded portion 102 and the first threaded exterior portion 104 may have a fine thread pitch, for example.

The impeller collar 70 may extend from a first collar end 106 to a second collar end 108. In one exemplary embodiment, the first collar end 106 may be disposed adjacent the rear end 86 of compressor impeller 36. The impeller collar 70 may have a cap portion 110 disposed at the first collar end 106, and configured to form a cap bore 112 that may have a diameter such that the cap portion may be disposed around the outer surface of the hub extension 80. In one exemplary embodiment, the cap portion 110 may engage with the outer surface of the hub extension via an interference fit, however, it is also contemplated that a clearance fit may be alternatively employed.

The impeller collar 70 may also include a stepped bore 114 having an insert region 116 and a shaft region 118. The insert region 116 may have a larger diameter bore than the shaft region 118. The insert region 116 of the impeller collar 70 may be dimensioned such that it may surround the second insert portion 98 disposed outside first impeller bore 88, which may in turn surround a leading shaft portion 120 of the shaft 38, which may in turn surround a second threaded exterior portion 132 of the stud 74.

The shaft 38 may be coupled to, and extend from, the turbine wheel 30. More specifically, the shaft 38 may include the leading shaft portion 120, a mid-shaft portion 122, and a trailing shaft portion 124. The leading shaft portion 120 may be disposed within the second insert portion 98 of the insert 68. The leading shaft portion 120 may have an exterior surface 126 which may engage with an interior surface 128 of the second insert portion 98 of the insert 68. The exterior surface 126 may include an anti-rotation feature 170, which will be discussed further below in reference to FIG. 6. An interior surface 130 of the leading shaft portion 120 may be threaded so as to matingly engage a second threaded exterior portion 132 of the stud 74. As such, the threaded interior surface 130 of the leading shaft portion 120 may have the same pitch as the second threaded exterior portion 132 of the stud 74. In an exemplary embodiment, the pitch of the second threaded exterior portion 132 may be coarse, such that the pitch of the first threaded exterior portion 104 may be finer than the pitch of the second threaded exterior portion.

Finally, the mid-shaft portion 122 may have a generally cylindrical exterior shape. In an alternative embodiment, however, it is contemplated that the exterior surface of the mid-shaft portion 122 may have an elliptical, polygonal or any other shape known in the art. The mid-shaft portion 122 may engage with a portion of the impeller collar 70 via a clearance fit or an interference fit. The trailing shaft portion 124 may also have a generally cylindrical outer surface 182, and may generally have a diameter larger than a diameter the mid-shaft portion 122, creating a shoulder 134 on the shaft 38. The thrust washer 72 may be disposed axially between an end shoulder 136 of the impeller collar 70 and the shoulder 134 of the shaft 38. Similarly, the thrust washer 72 may be radially disposed to surround an exterior surface of a turbine side extension 138 of the impeller collar 70 via, for example an interference or clearance fit. The turbine side extension 138 of the impeller collar 70, therefore, may be radially disposed between the shaft 38 and the thrust washer 72. Two pilots may be formed by this arrangement. A first pilot 140 may be formed at a distal end 144 of the turbine side extension 138 of the impeller collar 70, and a second pilot 142 may be formed at a proximal end 146 of the turbine side extension of the impeller collar.

Figure 6:
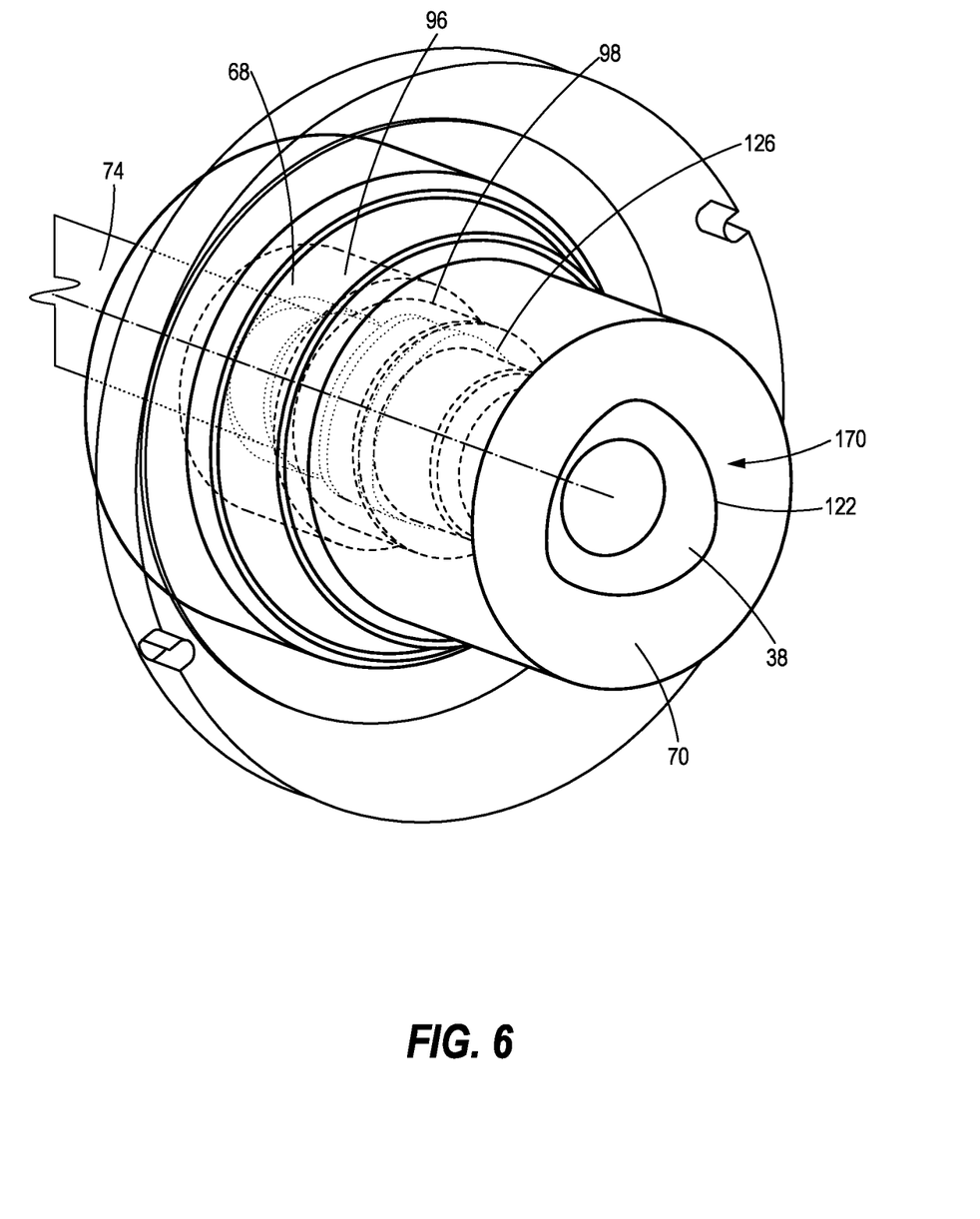
FIG. 6 is a perspective view of an exemplary disclosed anti-rotation feature of the turbocharger rotor of FIG. 3, in accordance with an embodiment of the present disclosure.

FIG. 6 illustrates a cutaway perspective view of the anti-rotation feature 170 formed by the external geometry of the shaft 38 at the leading shaft portion 120 and the mid-shaft portion 122 (see e.g. FIG. 5). As illustrated, the external geometry of the shaft 38 along the leading shaft portion 120 and the mid-shaft portion 122 may have a three-lobed polygonal shape. A bore of the impeller collar 70 may also have a three-lobed polygonal shape corresponding to the shape of outer surface of the shaft. The anti-rotation feature 170 may help prevent relative rotational motion between the insert 68 and impeller collar 70. Similarly, the anti-rotation feature 170 may also assist with centering the stud 74 to ensure the stud, the shaft 38, the insert 68 and the impeller collar 70 remain concentric with each other during installation and operation.

INDUSTRIAL APPLICABILITY

In practice, the teachings of the present disclosure may find applicability in many industries including, but not limited to, the railroad, marine, power generation, mining, construction, and farming industries, as well as other industries known in the art. More specifically, the present disclosure may be beneficial to locomotives, other vehicles, and any other machine utilizing a turbocharger.

Traditionally, turbocharger rotors require attachment of the compressor impeller to the shaft system via a joint. This joint must align to the shaft system along its axis and rotationally during rotor balancing and assembling installation with little to no variance from the balanced state in order to maintain secure throughout the rotor service life. Repeated assembly and disassembly, for example, should not alter the balance consistency. Further, the joint should only require simple tools and methods of construction to minimize assembly duration and provide similar benefits during remanufacture of the entire assembly.

In contrast to other joints, the present impeller attach mechanism employs a novel means of alignment, attachment, torque transmission and fastening. For example, the shaft pilots 140, 142 align both the compressor impeller 36 and the thrust washer 72 via the impeller collar 70. The shoulder 134 of the shaft 38 transmits aerodynamic thrust through the thrust washer 72. Further, in one embodiment illustrated in FIG. 6, two identical alignment and torque transmission three-lobed polygons formed by the external geometry of the shaft 38 at the leading shaft portion 120 and the mid-shaft portion 122 may interface with the impeller collar 70 and the insert 68. Finally, a hollow section 148 formed by the shaft minimized wall thickness to allow stretch for joint fixity while providing bending stiffness.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A turbocharger having an impeller attach mechanism, the turbocharger comprising: a stud extending from a central bore of a compressor impeller toward a turbine wheel, the stud having a first threaded region and a second threaded region; a shaft coupled to the turbine wheel and extending toward the compressor impeller, the shaft having a leading portion, the leading portion having a threaded interior configured to engage the second threaded region of the stud; and an insert having an internal portion and an external portion, the internal portion having a threaded external surface to engage the compressor impeller, the internal portion having a threaded internal surface to engage the first threaded region of the stud, the external portion configured to surround the leading portion of the shaft.

2. The turbocharger of claim 1, wherein the compressor impeller includes a hub extension, the hub extension having an impeller bore, the impeller bore having an internally threaded surface to matingly engage the threaded external surface of the internal portion of the insert.

3. The turbocharger of claim 2, further including an impeller collar having a first region proximate the compressor impeller, the first region configured to engage an external surface of the hub extension.

4. The turbocharger of claim 3, wherein the impeller collar includes a second region abutting the first region, the second region configured to engage an external surface of the external portion of the insert.

5. The turbocharger of claim 4, wherein the impeller collar includes a third region abutting the second region, the third region configured to engage a portion of an external surface of the shaft.

6. The turbocharger of claim 3, further including a thrust washer.

7. The turbocharger of claim 6, wherein the impeller collar includes a fourth region positioned proximate the turbine wheel, the thrust washer having a washer bore dimensioned to engage an external surface of the fourth region.

8. The turbocharger of claim 1, wherein an exterior surface of the leading portion of the shaft includes an anti-rotational feature.

9. The turbocharger of claim 8, wherein the anti-rotational feature includes a three-lobed polygon.

10. The turbocharger of claim 1, wherein a pitch of the first threaded region is finer than a pitch of the second threaded region.

11. A turbocharger having an impeller attach mechanism, the turbocharger comprising: a stud extending from a central bore of a compressor impeller, the stud having a first threaded region and a second threaded region; a shaft coupled to a turbine wheel, the shaft having a leading portion with a threaded interior configured to engage the second threaded region of the stud; an insert having an internal portion and an external portion, the internal portion housed within the compressor impeller, the internal portion having a threaded internal surface to engage the first threaded region of the stud, the external portion configured to engage an external surface of the leading portion of the shaft; a thrust washer having a washer bore; and an impeller collar having a turbine side extension radially disposed in the washer bore between the shaft and the thrust washer.

12. The turbocharger of claim 11, wherein a first pilot is formed at a distal end of the turbine side extension between an external surface of the turbine side extension and an interior surface of the washer bore.

13. The turbocharger of claim 11, wherein a second pilot is formed at a proximal end of the turbine side extension between an internal surface of the turbine side extension and an external surface of the shaft.

14. The turbocharger of claim 11, wherein an insert pilot may be formed between an internal surface of the insert and an external surface of the stud.

15. The turbocharger of claim 11, wherein an exterior surface of the leading portion of the shaft includes an anti-rotational feature, the anti-rotational feature including a three-lobed polygon.

16. The turbocharger of claim 11, wherein the shaft includes a middle portion having an exterior surface engaging a portion of an interior surface of the impeller collar and including an anti-rotational feature, the anti-rotational feature including a three-lobed polygon.

17. A turbocharger, the turbocharger comprising:
a turbine wheel;
a compressor impeller having a central bore, the compressor impeller including a hub extension protruding toward the turbine wheel;
a stud extending from the central bore of the compressor impeller, the stud having a first threaded region and a second threaded region;
a shaft coupled to the turbine wheel, the shaft having a leading portion, the leading portion having a threaded interior configured to engage the second threaded region of the stud; and
an insert having an internal portion and an external portion, the internal portion having a threaded internal surface to engage the first threaded region of the stud, the internal portion of the insert dimensioned to radially encase the first threaded region of the stud, the hub extension dimensioned to radially encase the internal portion of the insert, the leading portion of the shaft dimensioned to radially encase the second threaded region of the stud, and the external portion of the insert dimensioned to configured to radially encase the leading portion of the shaft.

18. The turbocharger of claim 17, further including an impeller collar with an impeller side extension, a main body section and a turbine side extension, wherein the impeller side extension is dimensioned to radially encase the hub extension.

19. The turbocharger of claim 18, wherein a portion of the main body section of the impeller collar is dimensioned to radially encase the external portion of the insert.

20. The turbocharger of claim 18, further including a thrust washer dimensioned to radially encase the turbine side extension of the impeller collar, the turbine side extension dimensioned to radially encase a portion of the shaft proximate the turbine wheel.

* * * * *